United States Patent
Umemoto

(10) Patent No.: US 6,729,736 B2
(45) Date of Patent: May 4, 2004

(54) LIGHT PIPE, PLANAR LIGHT SOURCE UNIT AND REFLECTION TYPE LIQUID-CRYSTAL DISPLAY DEVICE

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/983,473

(22) Filed: Oct. 24, 2001

(65) Prior Publication Data

US 2002/0048164 A1 Apr. 25, 2002

(30) Foreign Application Priority Data

Oct. 24, 2000 (JP) .................................. P. 2000-323467

(51) Int. Cl.[7] .................................................. F21V 7/04
(52) U.S. Cl. ......................... 362/31; 362/26; 362/551; 362/330
(58) Field of Search .................... 362/31, 26, 551, 362/561, 326, 330; 385/146

(56) References Cited

U.S. PATENT DOCUMENTS

| | | | |
|---|---|---|---|
| 4,811,507 A | * | 3/1989 | Blanchet ................ 40/546 |
| 5,183,597 A | | 2/1993 | Lu |
| 5,339,179 A | | 8/1994 | Rudisill et al. |
| 5,341,231 A | | 8/1994 | Yamamoto et al. |
| 5,390,276 A | | 2/1995 | Tai et al. |
| 5,485,291 A | | 1/1996 | Qiao et al. |
| 5,584,556 A | | 12/1996 | Yokoyama et al. |
| 5,671,994 A | | 9/1997 | Tai et al. |
| 5,712,694 A | | 1/1998 | Taira et al. |
| 5,727,107 A | | 3/1998 | Umemoto et al. |
| 5,808,713 A | | 9/1998 | Broer et al. |
| 5,897,184 A | | 4/1999 | Eichanlaub et al. |

(List continued on next page.)

FOREIGN PATENT DOCUMENTS

| | | | |
|---|---|---|---|
| EP | 867 747 A2 | 9/1998 | |
| EP | 0 879 991 A2 | 11/1998 | |
| JP | 5-158033 | 6/1993 | |
| JP | 9-297222 | 11/1997 | |
| JP | 10-106328 | 4/1998 | |
| JP | 331593 | 5/1998 | |
| JP | 11-142618 | 5/1999 | |
| JP | 11-203923 | 7/1999 | ............ F21V/8/00 |
| JP | 11-224510 | 8/1999 | ............ F21S/1/00 |
| JP | 11-231797 | 8/1999 | ............ G09F/9/00 |
| JP | 2000-147499 | 5/2000 | |
| TW | 338869 | 8/1998 | |
| WO | WO 97/01610 | 1/1997 | |
| WO | WO 97/30373 | 8/1997 | |
| WO | WO 97-47467 | 12/1997 | |

OTHER PUBLICATIONS

Ohkawa, U.S. Publication 2002/0044436 A1, Light Guide Plate, Surface Light Source Device and Display.*
Patent Abstracts of Japan, 11–224510, Aug. 17, 1999.
Patent Abstracts of Japan, 11–231797., Aug. 27, 1999.
Patent Abstracts of Japan, 11–203923, Jul. 30, 1999.

*Primary Examiner*—Stephen Husar
*Assistant Examiner*—Sharon Payne
(74) *Attorney, Agent, or Firm*—Sughrue Mion, PLLC

(57) ABSTRACT

There is provided a planar light source unit having a light pipe and a point light source, the light pipe being constituted by a plate-like body having upper and lower surfaces and a side surface serving as an incident surface on which incident light is made to exit from the lower surface through light exit means formed on the upper surface, the light exit means being disposed to face at least one virtual center on or outside the incidence side surface, the incident light made to exit from the upper or lower surface being transmitted to exit from the lower or upper surface through the plate-like body. There is also provided a reflection type liquid-crystal display device having a planar light source unit and a liquid-crystal panel including a reflection layer, the point light source being disposed in the virtual center or between the virtual center and the incidence side surface.

9 Claims, 5 Drawing Sheets

U.S. PATENT DOCUMENTS

| | | |
|---|---|---|
| 5,945,209 A | 8/1999 | Okazaki et al. |
| 5,961,198 A | 10/1999 | Hira et al. |
| 6,044,196 A | 3/2000 | Winston et al. |
| 6,060,183 A | 5/2000 | Higashi et al. |
| 6,130,730 A | 10/2000 | Jannson et al. |
| 6,147,732 A | 11/2000 | Aoyama et al. |
| 6,168,281 B1 | 1/2001 | Suzuki |
| 6,196,692 B1 | 3/2001 | Umemoto et al. |
| 6,199,995 B1 | 3/2001 | Umemoto et al. |
| 6,236,439 B1 | 5/2001 | Sakai et al. |
| 6,295,104 B1 * | 9/2001 | Egawa et al. ............... 349/63 |
| 6,322,236 B1 | 11/2001 | Campbell et al. |
| 6,334,689 B1 | 1/2002 | Taniguchi et al. |
| 6,369,950 B1 | 4/2002 | Umemoto |
| 6,375,336 B1 | 4/2002 | Suzuki et al. |
| 6,384,881 B1 | 5/2002 | Arai et al. |
| 6,454,452 B1 | 9/2002 | Sasagawa et al. |
| 6,485,157 B2 | 11/2002 | Ohkawa |
| 6,490,401 B2 | 12/2002 | Cornelissen et al. |
| 2001/0009474 A1 | 7/2001 | Umemoto et al. |
| 2001/0011779 A1 | 8/2001 | Stover |
| 2001/0012158 A1 | 8/2001 | Umemoto et al. |
| 2001/0012159 A1 | 8/2001 | Umemoto et al. |
| 2001/0053029 A1 | 12/2001 | Umemoto et al. |

* cited by examiner

LIGHT PIPE, PLANAR LIGHT SOURCE UNIT AND REFLECTION TYPE LIQUID-CRYSTAL DISPLAY DEVICE

BACKGROUND OF THE INVENTION

1. Field of the Invention

The present invention relates to a light pipe which can be used in combination with a point light source to form a planar light source unit excellent in luminance and, which can be used to form a reflection type liquid-crystal display device free from moire, bright and easy to view.

The present application is based on Japanese Patent Application No. 2000-323467, which is incorporated herein by reference.

2. Description of the Related Art

There has been proposed a front-light reflection-illumination type liquid-crystal display device in which a planar light source unit constituted by a side light pipe is disposed on the visual side of a reflection type liquid-crystal panel so that display can be viewed in a dark place or the like. Such a front light system can use a liquid-crystal panel having a reflection layer with a high reflectance. Hence, the front light system has an advantage, in enhancement of luminance in a reflection mode, over a backlight system which requires a semi-transmission type of a half-silvered mirror for forming a reflection-illumination type liquid-crystal display device.

A plate-like body 8 having a stripe-like light exit means B provided in its upper surface as shown in FIG. 5 was heretofore known as a light pipe allowed to be used in the aforementioned front light system. A light source was disposed on an incidence side surface 8c of the light pipe 8 to thereby form a planar light source. In this case, a linear light source such as a fluorescent lamp was disposed because the angle of incidence of light onto the light exit means B varied largely in accordance with the place where the point light source is arranged so that light is emitted only partially from the light pipe. In the front light system, however, display light was viewed through the light pipe. There was a problem that moire was apt to occur because the stripes of the light exit means B interfered with pixels disposed tessellatedly or zigzag in the liquid-crystal panel.

On the other hand, a light pipe having a light exit means constituted by a structure of spherical dots or sectionally cylindrical pits to thereby perform light emission by a point light source was also known. In the light pipe, however, light was reflected by a spherical or cylindrical surface. Hence, light was diffused largely so that exit light was inclined largely with respect to the normal line direction (frontal direction) of the light pipe. There was therefore a problem that the percentage of light entering the reflection type liquid-crystal panel as illumination light was too small to obtain bright display.

SUMMARY OF THE INVENTION

An object of the present invention is to develop a light pipe which can be used in combination with a point light source to form a compact planar light source unit excellent in uniform light emission from the whole surface thereof and small in light source-disposing space and, which can be used to form a reflection type liquid-crystal display device excellent in brightness, free from moire and excellent in display quality both in a reflection mode and in an illumination mode.

According to the present invention, there is provided a light pipe constituted by: a plate-like body having upper and lower surfaces; and an incidence side surface constituted by a side surface between the upper and lower surfaces, the plate-like body including light exit means formed in the upper surface so that light incident on the incidence side surface is made to exit from the lower surface through the light exit means, the light exit means being in an arrangement to face at least one virtual center on or outside the incidence side surface, whereby incident light from the upper or lower surface is transmitted to exit from the lower or upper surface through the plate-like body. There is further provided a planar light source unit constituted by the light pipe, wherein a point light source is disposed in the virtual center of the light exit means of the light pipe or between the virtual center and the incidence side surface; and a reflection type liquid-crystal display device constituted by the planar light source unit, and a liquid-crystal panel including a reflection layer disposed on a lower surface side of the light pipe in the planar light source unit.

According to the present invention, a point light source is disposed in the virtual center, or the like, for the light exit means of the light pipe so that uniform light emission from the whole lower surface of the light pipe can be obtained. Hence, a compact planar light source unit small in light source-disposing space can be formed. The planar light source unit can be used to form a reflection type liquid-crystal display device excellent in brightness, free from moire and excellent in display quality both in a reflection mode and in an illumination mode.

Particularly when a light exit means constituted by pit-like minute concave or convex portions each having an optical path changing surface inclined at an angle in a range of from 35 to 48 degrees with respect to a reference plane of the lower surface is provided as means by which light incident on an incidence side surface is reflected toward the lower surface, light transmitted in the light pipe radially from the point light source can be made to exit with good directivity from the lower surface through the optical path changing surfaces in the normal line direction. Moreover, the density of the arranged optical path changing surfaces can be adjusted easily. Hence, the influence of the light pipe on light transmitted vertically through the light pipe can be controlled through the area occupied by the light exit means. Hence, the influence of the light pipe on liquid-crystal display can be suppressed to attain improvement of display quality.

Features and advantages of the invention will be evident from the following detailed description of the preferred embodiments described in conjunction with the attached drawings.

DETAILED DESCRIPTION OF THE PREFERRED EMBODIMENTS

Figure 1A:
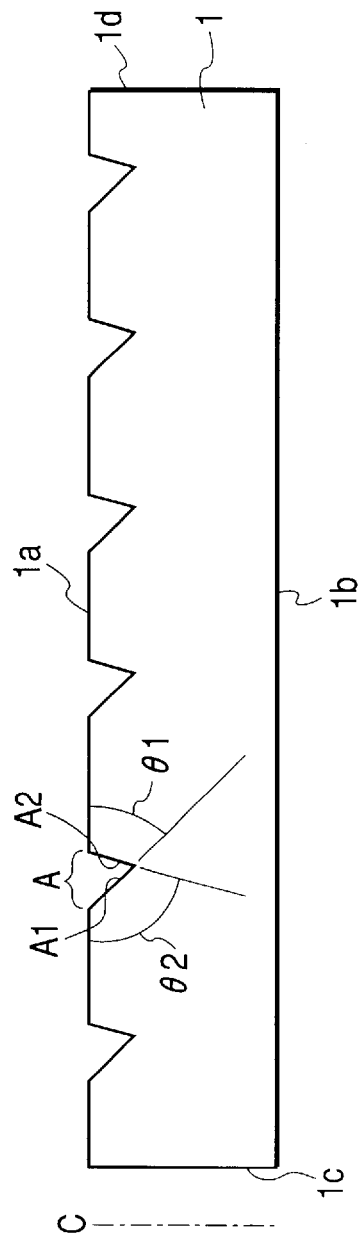
FIGS. 1A and 1B are explanatory side views of an example of a light pipe.
Figure 1B:
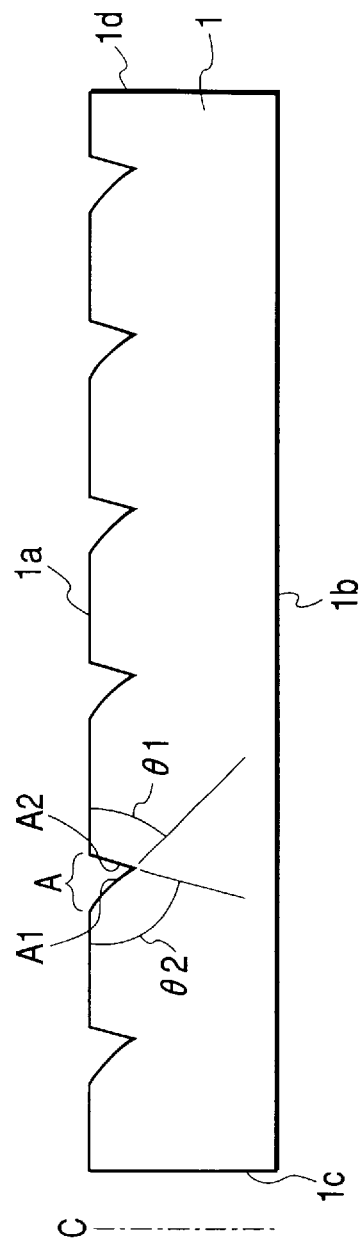

The light pipe according to the present invention is constituted by: a plate-like body having upper and lower surfaces; and an incidence side surface constituted by a side surface between the upper and lower surfaces, the plate-like body including light exit means formed in the upper surface so that light incident on the incidence side surface is made to exit from the lower surface through the light exit means, the light exit means being in an arrangement to face at least one virtual center on or outside the incidence side surface, whereby incident light from the upper or lower surface is transmitted to exit from the lower or upper surface through the plate-like body. Examples of the light pipe are shown in FIGS. 1A and 1B. Alight pipe 1 has an upper surface 1$a$ provided with a plurality of light exit means A, a lower surface 1$b$ as a light exit side, an incidence side surface 1$c$, and a counter end 1$d$ opposite to the incidence side surface. The reference symbol C designates a virtual center which is outside the incidence side surface.

The light pipe is provided so that light incident on the incidence side surface is made to exit from the lower surface through the light exit means formed in the upper surface. The light pipe is generally constituted by a transparent plate-like body of a pentahedron or hexahedron having an upper surface 1$a$, a lower surface 1$b$ opposite to the upper surface, at least one incidence side surface 1$c$ which is a side surface between the upper and lower surfaces, and a counter end 1$d$ opposite to the incidence side surface, as shown in FIGS. 1A and 1B. The plate-like body may be a uniform-thickness plate as shown in FIGS. 1A and 1B or may be formed so that the thickness of the counter end opposite to the incidence side surface is smaller than that of the incidence side surface, especially not larger than 50% of the incidence side surface. The reduction in thickness of the counter end is advantageous in improvement in efficiency of light which is incident on the incidence side surface and transmitted toward the light exit means, reduction in weight of the light pipe, and so on.

Figure 2A:
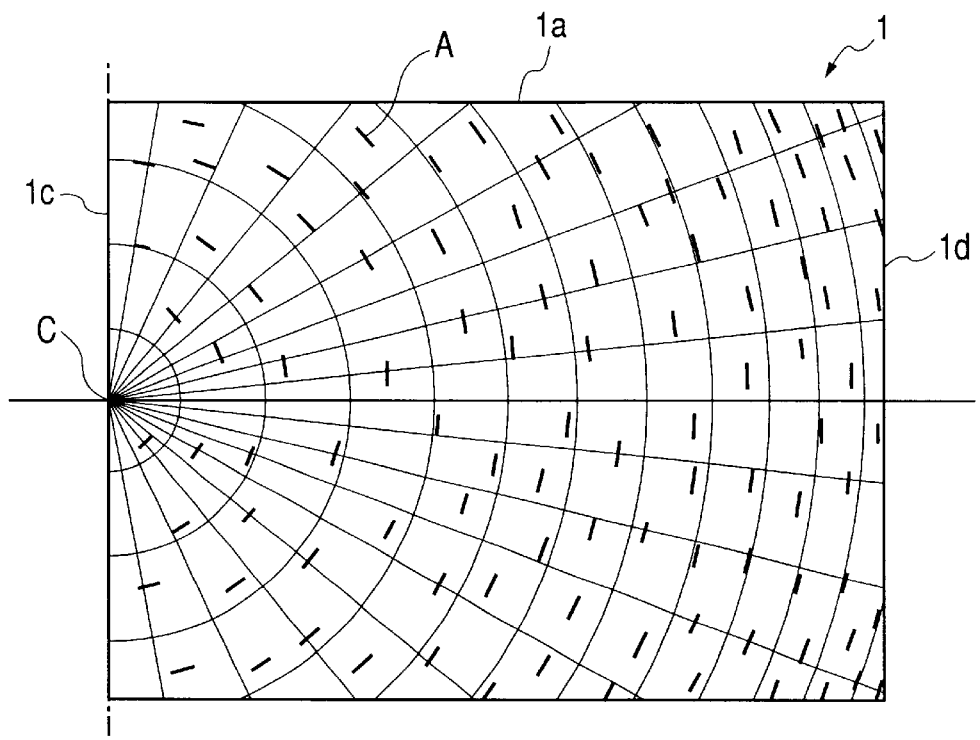
FIGS. 2A and 2B are explanatory plan views of pit-like arrangement of concave or convex portions.
Figure 2B:
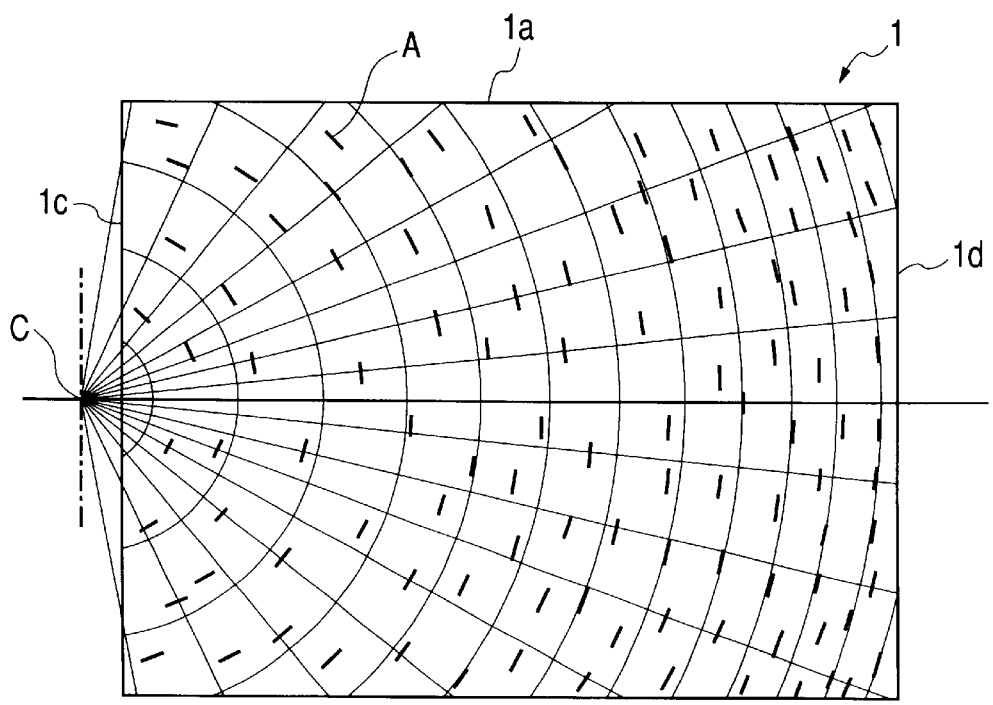

Any suitable material can be used as the light pipe if the suitable material exhibits the characteristic as follows. That is, a plurality of light exit means A are disposed in the upper surface 1$a$ so as to face at least one virtual center C which is on or outside the incidence side surface 1$c$ as shown in FIGS. 2A and 2B so that the light incident on the incidence side surface is made to exit from the lower surface and the light can be transmitted vertically. Hence, the light exit means provided in the upper surface of the plate-like body may be constituted by suitable means exhibiting such characteristic. From the point of view of achieving the characteristic, or the like, preferably, the plurality of light exit means A are formed by a repetitive structure of pit-like arrangement of concave or convex portions each shaped substantially like a scalene triangle in section, as shown in FIGS. 2A and 2B.

Figure 6:
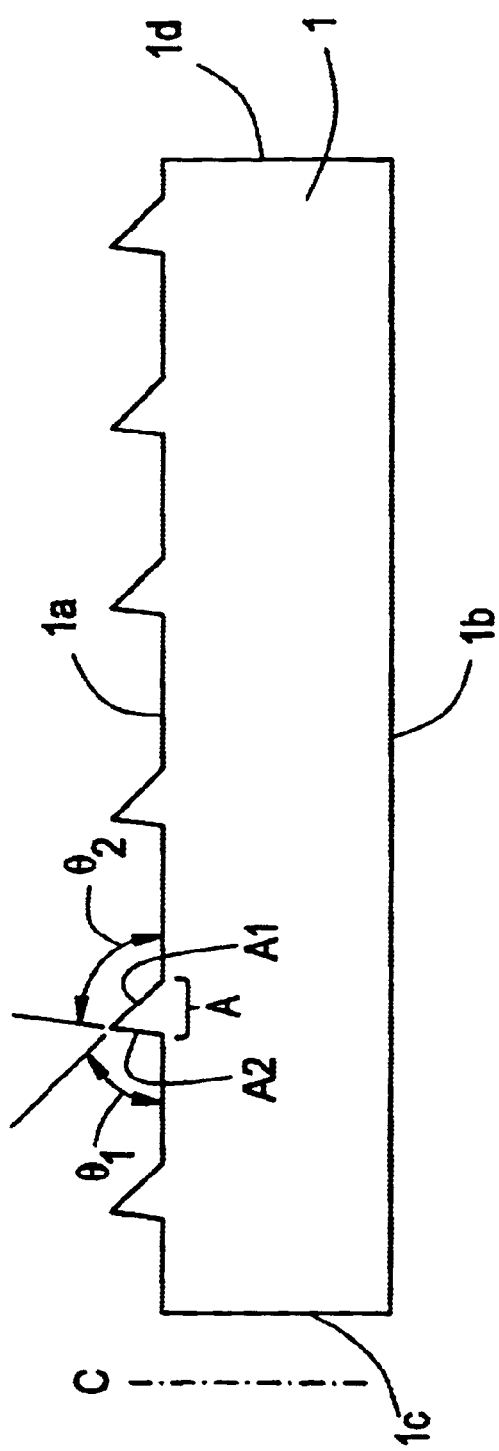
FIG. 6 is an alternative embodiment showing a convex arrangement.

Although the concave or convex portions of pit-like arrangement may be replaced by concave or convex portions each having equilateral surfaces, it is preferable from the point of view of light-utilizing efficiency or the like that each of the thus formed concave or convex portions is constituted by an optical path changing surface and an elevation surface. Examples of the light exit means A constituted by concave portions are shown in FIGS. 1A and 1B. The light exit means A constituted by convex portions is shown in FIG. 6. Each of the light exit means is constituted by an optical path changing surface A1 and an elevation surface A2.

Incidentally, the discrimination between concave portions and convex portions is based on whether each light exit means is depressed (grooves) from the upper surface into the light pipe or whether each light exit means is protruded from the upper surface toward the outside of the light pipe. From the point of view of preventing the light exit means from being damaged, etc., the shape of concave portions is preferred to the shape of convex portions.

The aforementioned optical path changing surfaces are provided so that the optical path changing surfaces reflect the light incident on the incidence side surface in an illumination mode toward the lower surface to thereby change the optical path of the light. When the optical path changing surfaces are disposed in the form of pit-like arrangement or the like so as to face the virtual center C as perpendicularly as possible as shown in FIGS. 2A and 2B, the point light source can be converted into a planar light source having any means for converting light from the point light source into light of a linear light source such as a linear light pipe or the like. Hence, light emission can be performed efficiently without any light loss due to the linear light pipe or the like.

That is, in the case of a point light source, light radiated from the point light source as a center is diverged so as to be transmitted in the light pipe. In this case, the transmitted light is refracted at the time of incidence on the light pipe and takes also a state of light radiated from the center located on or outside the incidence side surface. Hence, when the center of the radial light transmitted in the light pipe is regarded as a virtual center so that the optical path changing surfaces are disposed to be as perpendicular to the radial light as possible, the optical path of the radial light can be changed toward the lower surface efficiently.

In order to achieve bright and easy-to-see light-crystal display by making light, which is reflected by the optical path changing surfaces, exit from the lower surface of the light pipe with good directivity in the direction of the line normal as described above, and by improving illumination efficiency of the liquid-crystal panel, each of the optical path changing surfaces is preferably inclined at an angle $\theta 1$ (FIGS. 1A and 1B) in a range of from 35 to 48 degrees, more preferably in a range of from 38 to 45 degrees, further preferably in a range of from 40 to 43 degrees with respect to the reference plane of the lower surface. Incidentally, from the point of view of efficiency of incidence, preferably, each optical path changing surface faces the incidence side surface. Hence, both in the case where the light exit means is constituted by concave portions and in the case where the light emit means is constituted by convex portions, the optical path changing surfaces are preferably formed as slopes inclined downward from the incidence side surface 1$c$ side to the counter end 1$d$ side. However, the optical path changing surfaces are not limited thereto.

On the other hand, the elevation surfaces A2 opposite to the optical path changing surfaces A1 preferably makes no contribution to exit of the light, which is incident on the incidence side surface, from the lower surface and has no influence on display quality and light transmission or light exit if is necessary to do so. Incidentally, if the inclination angle $\theta 2$ (FIGS. 1A and 1B) of each of the elevation surfaces with respect to the reference plane of the lower surface is too small, the projected area of the elevation surfaces on the upper and lower surfaces becomes large so that the light reflected by the elevation surfaces in a reflection mode is apt to go back to the direction of viewing to thereby lower display quality.

Hence, the inclination angle $\theta 2$ of each of the elevation surfaces is advantageously selected to be larger so that the projected area of the elevation surfaces on the upper and lower surfaces can be reduced. Moreover, the vertical angle between the optical path changing surface and the elevation surface can be reduced, so that the surface-reflected light can be reduced and can be inclined in the direction of the plane of the light pipe. Accordingly, the influence of the reflected light by the elevation surfaces on liquid-crystal display can be suppressed. From this point of view, the inclination angle $\theta 2$ of each of the elevation surfaces is preferably not lower than 50 degrees, more preferably not lower than 60 degrees, further preferably not lower than 75 degrees. Incidentally, from the aforementioned point of view, the ideal value of the inclination angle $\theta 2$ is 90 degrees. However, this value is not preferred from the point of view of efficiency in production of the light pipe because the elevation surfaces can hardly be formed by a shape transfer system using a mold, or the like.

Although the concave or convex portions serving as the light exit means maybe formed as continuous lines of a polygon, a semicircle or the like, it is preferable, from the point of view of arrangement of the concave or convex portions facing the virtual center C, that the concave or convex portions are formed as a repetitive structure of intermittent pit-like arrangement of discontinuous concave or convex portions A as shown in FIGS. 2A and 2B. In this case, the concave or convex portions are preferably small-sized from the point of view of improvement of display quality by preventing suppression of visual sensation and by preventing image disturbance caused by the suppression of visual sensation. If the size of each of the concave or convex portions is too large, controllability of arrangement density is deteriorated. If the arrangement density is too low, illumination to pixels becomes uneven so that light emission is apt to vary. As a result, each of the concave or convex portions appears as a light emission point, so that display quality is apt to be lowered.

From the point of view of controllability of the suppression of visual sensation and controllability of arrangement density based on the number of concave or convex portions arranged, or the like, the size of each of the concave or convex portions is preferably selected so that the width thereof is not larger than 200 $\mu$m, particularly not larger than 150 $\mu$m, further particularly not larger than 100 $\mu$m and the depth thereof is not larger than 50 $\mu$m, particularly not larger than 20 $\mu$m, further particularly not larger than 10 $\mu$m. On the other hand, if the size of each of the concave or convex portions is too small, diffraction holds a dominant position. As a result, reflected light can hardly be formed. Moreover, the light pipe can hardly be produced because of increase in the number of the concave or convex portions arranged. From this point of view, the size of each of the concave or convex portions is preferably selected so that the width thereof is not smaller than 10 $\mu$m and the depth thereof or the like is not smaller than 2 $\mu$m.

Incidentally, the aforementioned width means a circumferential length in a circle with the virtual center as its center. The depth or height is measured by referring to the upper surface of the light pipe. Although the shapes of the concave or convex portions formed intermittently are not particularly limited, the concave or convex portions are preferably provided as slopes inclined at an angle not smaller than 30 degrees, particularly not smaller than 45 degrees, further particularly not smaller than 60 degrees, from the point of view of suppression of the influence of reduction in light incident on the concave or convex portions.

With the provision of the pit-like arrangement of the concave or convex portions, light is emitted from the lower surface of the light pipe as uniformly as possible in the condition that the point light source is disposed as described above. Therefore, in order to dispose the point light source outside the side surface of the light pipe easily, the pit-like arrangement is made so that the virtual center C is formed on (FIG. 2A) or outside (FIG. 2B) the incidence side surface 1c of the light pipe 1 and each optical path changing surface faces the virtual center as shown in FIGS. 2A and 2B.

In the aforementioned case, one side surface or two or more side surfaces of the light pipe can be provided as incidence side surfaces. Therefore, one virtual center or two or more virtual centers can be formed correspondingly to the incidence side surface or surfaces. Moreover, two or more virtual centers may be formed for one incidence side surface. From the point of view of achieving uniform light emission from the lower surface, the virtual center is preferably formed in the approximate center of the incidence side surface when one virtual center is formed on one incidence side surface, and the virtual centers are preferably formed symmetrically with respect to the approximate center of the incidence side surface when a plurality of virtual centers are formed on one incident side surface.

The repetition of pit-like arrangement due to the intermittent arrangement of the concave or convex portions may be regular repetition. In order to prevent moire caused by interference between the concave or convex portions and pixels of the liquid-crystal panel, or in order to increase straight-moving light rays incident on the light exit means (optical path changing surfaces) as much as possible in the case where the point light source is disposed in the virtual center, and so on, it is preferable that the concave or convex portions are arranged at random as shown in FIGS. 2A and 2B. If the arrangement of the light exit means to face the virtual center overlaps the straight-moving light rays from the point light source, the straight-moving light rays are blocked by the light exit means located nearer to the point light source so that the quantity of light incident on the light exit means located farther from the point light source is lowered.

Hence, as the overlap area of the light exit means with the straight-moving light rays increases, the quantity of light incident on the light exit means located farther from the point light source decreases so that exit light is apt to be darken and luminance is apt to vary. Therefore, to prevent luminance from varying as described above, in irregular arrangement (random arrangement) of the light exit means disposed in the upper surface of the light pipe (plate-like body) so as to face the virtual center, it is preferable that the light exit means A are arranged more densely as the position of the light exit means A becomes farther from the virtual center as shown in FIGS. 2A and 2B. Such dense arrangement is effective from the point of view of preventing luminance from being lowered because the intensity of transmitted light decreases as the position becomes farther from the light source. Incidentally, since the aforementioned sparseness or denseness is judged based on the area of the light exit means A, the sparseness or denseness may be the low or high density of arrangement of the concave or convex portions constituting the light exit means or may be the small or large size of the concave or convex portions.

On the other hand, in a front-light liquid-crystal display device, liquid-crystal display is viewed through the light pipe disposed on the visual side both in the reflection mode and in the illumination mode as described above. If the area occupied by the light exit means in the light pipe is too large, viewing may be disturbed by the light exit means in the same manner as that in the case where the size of the light exit means is too large. Incidentally, as the light exit means overlap the pixels of the liquid-crystal panel more, exit of display light is disturbed more by slope reflection so that display is apt to be unnatural because of shortage of transmission of display light. Therefore, in order to prevent the disturbance of viewing to thereby obtain good display quality, the area occupied by the light exit means is preferably reduced so that display light can be transmitted sufficiently through the other portions excluding the light exit means in the upper surface of the light pipe.

On the other hand, the light exit means are, however, means for illuminating the liquid-crystal panel in an illumination mode. Hence, it is preferable from the point of view of improvement of luminance that the area occupied by the light exit means is as large as possible. Therefore, preferably, in order to keep balance between the visibility of liquid-crystal display and the luminance of the liquid-crystal display device in the illumination mode, the area occupied by the light exit means is determined in the arrangement of the light exit means. In the present invention, from this point of view, the occupied area of the light exit means based on its projected area on the upper surface of the plate-like body is selected preferably to be in a range of from $1/100$ to $1/8$, more preferably in a range of from $1/50$ to $1/10$, further preferably in a range of from $1/30$ to $1/15$. By selecting the occupied area in a such a manner, preferably, the light pipe can transmit the incident light from the upper surface (or lower surface) so that the transmitted light can be made to exit from the lower surface (or upper surface) efficiently without being influenced by the light exit means.

Incidentally, in the intermittent repetitive arrangement of the light exit means, the arrangement distance between the concave or convex portions can be determined suitably in accordance with the balance between the visibility and the luminance, the area occupied by the light exit means, and so on. In pit arrangement or the like, the arrangement distance between the concave or convex portions is generally random.

The light pipe can be provided as any suitable shape such as a uniform-thickness plate, a wedge-like shape or the like as described above. The surface shape of the light pipe can be also provided as any suitable shape such as a linear surface, a curved surface or the like. Further, the surface in which the light exit means are formed, especially each of the optical path changing surfaces A1, can be provided as any suitable shape such as a linear or refraction surface shown in FIG. 1A, a curved surface shown in FIG. 1B, or the like. In addition, in the light exit means, different shapes may be combined with one another as well as the different arrangement pitches.

From the point of view of easiness to attach the light pipe to the liquid-crystal panel or the like, formability of the light pipe, and so on, it is preferable that the upper and lower surfaces of the light pipe except the portion of the light exit means are flat surfaces as smooth as possible. When the upper and lower surfaces are curved surfaces or the like, it is preferable from the point of view of preventing disturbance of a display image that the curved surfaces are formed so as not to change dramatically in shape. Although the incidence side surface is generally shaped like a surface perpendicular to the lower surface, the incidence side surface may be shaped as an incidence side surface structure having an introduction portion interposed between the incidence side surface and the point light source in accordance with the light emission characteristic or the like of the point light source so that the efficiency of incidence on the light exit means can be improved.

The light pipe can be formed from a suitable material selected in accordance with the wavelength range of the point light source and exhibiting transparency to the wavelength range. Incidentally, in a visible light range, examples of the suitable material may include transparent resin represented by acrylic resin, polycarbonate resin, epoxy resin, polyester resin, norbornene resin; glass; etc. The suitable material may be used as a mixture of two kinds of materials selected from the above-mentioned examples. A light pipe made from a material exhibiting no birefringence or a little birefringence can be used preferably. Further, a light pipe made from a material which is small in specific gravity and which is excellent in lightweight characteristic is preferable.

The light pipe may be formed by a cutting method or by any suitable method. Examples of the preferable producing method from the point of view of mass production, or the like, may include: a method of transferring a shape to thermoplastic resin by hot-pressing the thermoplastic resin against a mold capable of forming a predetermined shape; a method of filling a mold capable of forming a predetermined shape with hot-melted thermoplastic resin or with resin fluidized by heat or through a solvent; a method of performing a polymerizing process after a mold capable of forming a predetermined shape is filled with liquid resin polymerizable by heat, by ultraviolet rays, by radiation rays, or the like, or after the liquid resin is cast in the mold; a method of performing a polymerizing process while a support base material such as a resin plate or film is brought into contact with a coating layer of liquid resin in the aforementioned case to thereby obtain an integrated body thereof; a method of performing a polymerizing process with radial rays while radiation-initiated polymerization type resin applied onto a film is brought into contact with a mold capable of forming a predetermined shape to thereby obtain an integrated body of the resin with the film; and so on.

Incidentally, if it is necessary, the body integrated with a film as described above may be bonded to a resin plate or the like through an adhesive agent to thereby form a light pipe having a necessary thickness. As described above, in the present invention, the light pipe may be formed as a laminate of parts or the like made from one kind of material or from different kinds of materials, such as a laminate obtained by bonding a sheet or film with a plurality of light exit means, onto a light guide portion taking charge of light transmission. That is, the light pipe need not be formed as an integral single layer body made from one kind of material. In addition, the thickness of the light pipe can be also determined suitably in accordance with the size of the light pipe, the size of the point light source, and so on. The general thickness of the light pipe in the case where the light pipe is used for forming a reflection type liquid-crystal display device is not larger than 10 mm, particularly in a range of from 0.1 to 5 mm, further particularly in a range of from 0.4 to 3 mm, in terms of the height of the incidence side surface of the light pipe.

By use of the light pipe according to the present invention, especially by use of the light pipe having a plurality of light exit means constituted by pit-like arrangement of concave-or convex portions as shown in FIGS. 2A and 2B, various kinds of devices such as a planar light source unit which is excellent in brightness and uniformity of brightness and which makes light, that is collimated accurately, exit from the planar light source unit in a direction excellent in perpendicularity favorable to visibility (in a normal-line direction) to thereby utilize light from a point light source efficiently, a reflection type liquid-crystal display device bright, easy to view and low in power consumption, and soon can be formed . Incidentally, for practical use of the light pipe, a hard coat layer may be provided on the upper surface of the light pipe as occasion demands, and an anti-reflection layer or the like may be provided on the lower surface of the light pipe.

Figure 3:
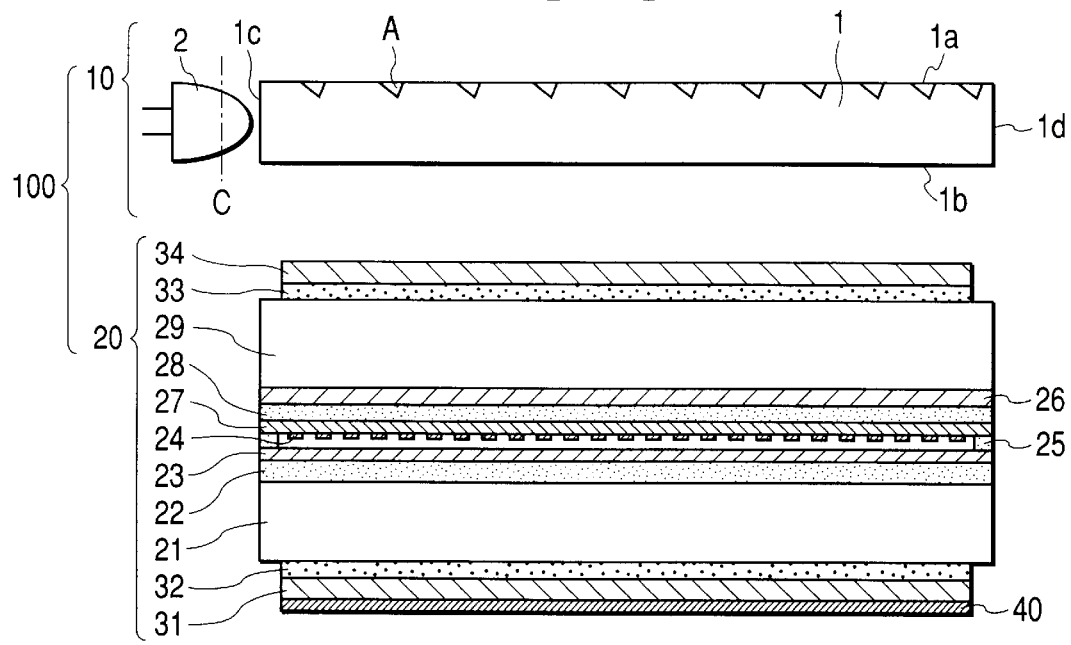
FIG. 3 is an explanatory side view of a planar light source unit and a reflection type liquid-crystal display device.

FIG. 3 shows an example of the planar light source unit 10 having the light pipe 1 according to the present invention. For example, the planar light source unit 10 can be formed by arranging a point light source 2 in the virtual center C for the plurality of light exit means A of the light pipe 1 or between the virtual center C and the incidence side surface 1c as shown in FIG. 3. The planar light source unit can be preferably used as a side front light system or the like. Moreover, it is easy to increase the area or the like of the planar-light source unit. A suitable material such as a light-emitting diode can be used as the point light source. The point light source can be driven through a suitable power supply. Incidentally, the point light source is made ON/OFF switchable because the point light source need not be turned on in the case of viewing the display in a reflection mode.

Figure 4:
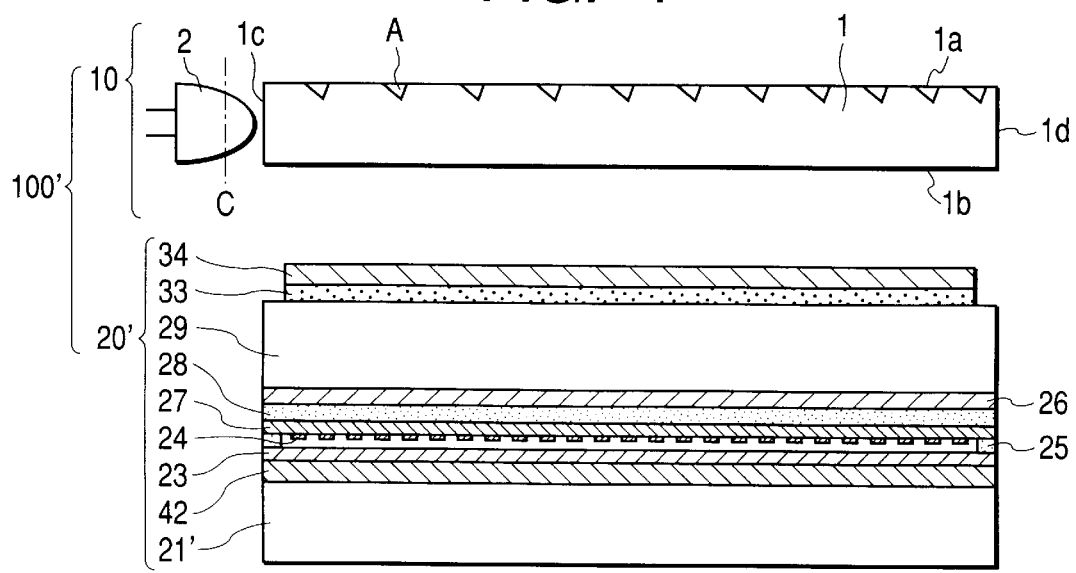
FIG. 4 is an explanatory side view of another reflection type liquid-crystal display device.
Figure 5:
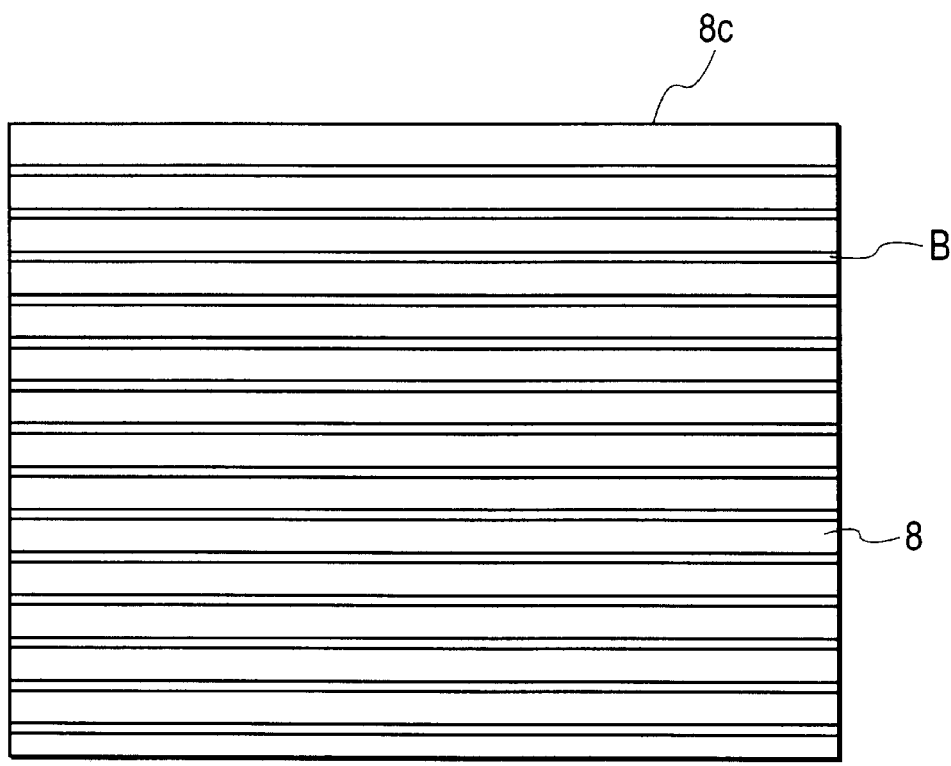
FIG. 5 is an explanatory plan view of an example of a background-art light pipe.

FIGS. 3 and 4 show, respectively, the reflection type liquid-crystal display device 100 and the reflection type liquid-crystal display device 100' each using the light pipe 1 or the planar light source unit 10 according to the present invention as a front light system by way of example. The reference numerals 20 and 20' designate liquid-crystal panels; 21, 21' and 29, panel substrates; 24, a liquid-crystal layer; 31 and 34, polarizers; and 40 and 42, reflection layers. As shown in FIG. 3 or 4, the reflection type liquid-crystal display device 100 or 100' can be formed by arranging a liquid-crystal panel 20 or 20' having a reflection layer 40 or 42 on the light exit side of the planar light source unit 10, that is, on the lower surface 1b side of the light pipe 1 of the planar light source unit 10.

Generally, the reflection type liquid-crystal display device is formed by suitably assembling constituent parts such as a liquid-crystal panel functioning as a liquid-crystal shutter, a driver attached to the liquid-crystal panel, a polarizer, a front light system, a reflection layer, an optional compensating phase retarder, and so on. The reflection type liquid-crystal display device according-to the present invention is not particularly limited except that the aforementioned light pipe or the planar light source unit using the light pipe is used. The reflection type liquid-crystal display device can be formed in accordance with a background-art front light display device as shown in FIGS. 3 and 4.

Hence, the liquid-crystal panel used is not particularly limited. For example, on the basis of the format of alignment of liquid crystal, there can be used a suitable liquid-crystal cell such as a twisted or non-twisted cell such as a TN liquid-crystal panel, an STN liquid-crystal panel, a perpendicularly aligned cell, an HAN cell, an OCB cell; a guest-host liquid-crystal cell or a ferroelectric liquid-crystal cell; and so on. Further, the system for driving the liquid crystal is not particularly limited. For example, a suitable drive system such as an active matrix system, a passive matrix system, or the like, may be used. Incidentally, generally, the liquid crystal is driven through transparent electrodes 22 and 28 attached to the panel substrates respectively or the electrode 42 serving also as a reflection layer as shown in FIGS. 3 and 4.

The arrangement of the reflection layer 40 or 42 is essential to the reflection type liquid-crystal display device. The position of arrangement of the reflection layer is optional. For example, the reflection layer may be provided in the outside of the liquid-crystal panel 20 as shown in FIG. 3 or may be provided in the inside of the liquid-crystal panel 20' as shown in FIG. 4. The reflection layer can be formed as a suitable reflection layer according to the background art. Examples of the reflection layer may include: a coating layer containing powder of a high-reflectance metal such as aluminum, silver, gold, copper, chromium, or the like in binder resin; a layer of a metal thin film deposited by a vapor deposition system, or the like; a reflection sheet having the coating or deposited layer supported by a base material; a sheet of metal foil; a transparent electrically conductive film; a dielectric multilayer film; and so on.

Incidentally, when the reflection layer 40 is disposed in the outside of the liquid-crystal panel 20 as shown in FIG. 3, the panel substrates 21 and 29 and the electrodes 22 and 28 need to be formed as transparent substrates and as transparent electrodes respectively in order to make liquid-crystal display possible. On the other hand, when the reflection layer 42 serving also as an electrode is disposed in the inside of the liquid-crystal panel 20' as shown in FIG. 4, the panel substrate 29 and the electrode 28 need to be formed as a transparent substrate and as a transparent electrode respectively in order to make liquid-crystal display possible, but the back side panel substrate 21' as well as the reflection layer 42 does not need to be transparent, that is, the back side panel substrate 21' may be made from an opaque body.

For the formation of the liquid-crystal panel, an alignment films 23 and 27 such as rubbing films for aligning liquid crystal, a color filter 26 for achieving color display, a polarizer 31 or 34, and so on, as shown in FIGS. 3 and 4, may be provided as occasion demands. The alignment film is generally disposed so as to be adjacent to the liquid-crystal layer. The color film is generally disposed between a panel substrate and an electrode. Further, the polarizer is provided for controlling display light through linear polarization. As shown in FIGS. 3 and 4, the polarizer is disposed in a suitable position on either or each of the visual and back sides of the liquid-crystal panel. Incidentally, the reference numeral 25 designates a sealing material for encapsulating liquid crystal 24 between panel substrates.

A suitable plate can be used as the polarizer. From the point of view of obtaining good-contrast-ratio display due to incidence of highly linearly polarized light, and so on, a plate with a high degree of polarization such as an absorption type linear polarizer of iodine or dye may be used preferably. Further, for the formation of a reflection type liquid-crystal display device, other suitable optical devices such as a light-diffusing layer, an anti-glare layer, a compensating phase retarder, and so on, may be disposed in suitable positions as occasion demands.

The compensating phase retarder is provided for compensating for retardation or the like due to the birefringence of the liquid-crystal layer to thereby attain improvement of display quality, and so on. As shown in FIG. 3 or 4, the compensating phase retarder 32 or 33 is generally disposed between the visual side or back side polarizer and a panel substrate, or the like. A suitable plate in accordance with the wavelength range or the like may be used as the compensating phase retarder. The phase retarder may be formed as one retardation layer or as a superposed layer of two or more retardation layers.

In the above description, viewing by the reflection type liquid-crystal display device 100 shown in FIG. 3 is performed as follows. In an illumination mode in which the planar light source unit 10 is turned on, light made to exit from the lower surface 1b of the light pipe 1 passes through the liquid-crystal panel 20 and is reflected by the reflection layer 40. Then, the reflected light passes through the liquid-crystal panel 20 reversely and reaches the light pipe 1. Thus, display light transmitted from the other portions excluding the light exit means A in the upper surface of the light pipe 1 is viewed. In a reflection mode in which the planar light source unit is turned off, incident light on the other portions excluding the light exit means in the upper surface 1a of the light pipe 1 is reflected by the reflection layer 40 and reaches the light pipe through the liquid-crystal panel. Thus, display light transmitted from the other portions excluding the light exit means is viewed.

On the other hand, viewing in the reflection type liquid-crystal display device 100' shown in FIG. 4 is performed as follows. In an illumination mode in which the planar light source unit 10 is turned on, light made to exit from the lower surface 1b of the light pipe 1 enters the liquid-crystal panel 20' and is reflected by the reflection layer 42 disposed in the panel 20'. Then, the reflected light passes through the liquid-crystal panel 20' reversely and reaches the light pipe 1. Thus, display light transmitted from the other portions excluding the light exit means A in the upper surface of the light pipe is viewed. In a reflection mode in which the planar light source unit is turned off, incident light on the other portions excluding the light exit means in the upper surface 1a of the light pipe 1 is reflected by the reflection layer 42, passes through the liquid-crystal panel in the reverse course and reaches the light pipe. Thus, display light transmitted from the other portions excluding the light exit means in the upper surface of the light pipe is viewed.

In the present invention, parts for forming the light pipe of the planar light source unit and parts for forming the liquid-crystal panel of the liquid-crystal display device may be wholly or partially integrally laminated and fixed to one another or may be disposed so as to be easily separable. From the point of view of suppressing interfacial reflection to prevent lowering of contrast, or the like, it is preferable that such parts are fixed to one another. It is preferable that at least the lower surface of the light pipe in the planar light source unit and the upper surface of the liquid-crystal panel are fixed to each other so as to adhere to each other. A suitable transparent adhesive agent such as an adhesive agent can be used for the fixing/adhering process. Transparent particles or the like may be contained in the transparent adhesive layer so that the transparent adhesive layer can be provided as an adhesive layer exhibiting a light-diffusing function.

Reference Example 1

Polyimide varnish was applied onto a clean glass plate by spin coating. After pre-baked at 100° C. for 30 minutes, the polyimide varnish was sintered at 350° C. for 4 hours. Thus, a polyimide coating film 10 μm thick was formed. A chromium film 0.1 μm thick and a copper film 0.5 μm thick were successively provided on the polyimide coating film by a sputtering system. A positive type resist 5 μm thick was applied onto a surface of the copper film by spin coating. Then, a predetermined chromium mask was disposed closely on the layer of the resist. After exposure by ultraviolet rays, the resist was developed. Further, the copper film and the chromium film were etched. Thus, a substrate was obtained. The substrate was configured so that apertures were formed radially in the copper layer on the glass plate by use of the chromium mask in which apertures with a size of 60 μm×10 μm were formed radially toward the longitudinal direction with the position distanced by 8 mm from a dot-forming end portion as its center and in which the apertures were arranged so irregularly that the density of the arranged apertures increased as the position became farther from the center.

Then, the substrate was disposed on a rotary stage so that the center of the rotary stage coincides with the center of arrangement of the apertures in the substrate. The substrate on the rotary stage was set at an angle of 43 degrees with respect to a laser beam. The substrate was irradiated with an excimer laser through the fan-like openings while the rotary stage was rotated and the laser beam was scanned by a large number of times. Thus, the polyimide coating film was partially removed by ablation. Further, the copper film and the chromium film were removed by etching. Then, a silver film was deposited on the substrate by vacuum evaporation and nickel-electrocasting was performed. The substrate was cut into a predetermined shape. Thus, there was obtained a mold A capable of forming a plurality of light exit means formed by a repetitive structure. Each light exit means was formed into a convex portion shaped like a scalene triangle, in section, having a width of about 60 μm and a height of about 5 μm. Each convex portion was constituted by an optical path changing surface inclined at an inclination angle of about 43 degrees, and an elevation surface inclined at an inclination angle of about 80 degrees with respect to a reference plane of the lower surface of the substrate. The convex portions were arranged intermittently like pits so that a virtual center was formed in the position outward distanced by about 8 mm from the center potion of the incidence side surface. The area occupied by the convex portions was not larger than $1/10$ as large as the whole area of the upper surface of the substrate.

Reference Example 2

A mold B was obtained in the same manner as in Reference Example 1 except that the convex portions could be formed in the condition that the area occupied by the convex portions was not larger than $1/15$ of the whole area of the upper surface.

Reference Example 3

A single surface of a brass plate having a predetermined size was cut continuously in the direction of the length of the plate by a diamond bite. Thus, there was obtained a mold C having a repetitive structure in which prismatic structures each having a steep slope with an inclination angle of 42 degrees and a projected width of 20 μm, and a gentle slope with a projected width of 190 μm were arranged adjacently at intervals of a pitch of 210 μm. The area occupied by the steep slopes was $1/10.5$.

EXAMPLE 1

Ultraviolet-curable acrylic resin was applied onto the mold A. An acrylic plate which was 1.2 mm thick, 40 mm wide and 30 mm long, and which had a side surface polished and a refractive index of 1.495 was quietly put on the acrylic resin. After the acrylic resin and the acrylic plate were made to adhere closely to each other by a rubber roller so that surplus resin and air bubbles were extruded, the acrylic resin was irradiated with 300 mJ/cm$^2$ of ultraviolet rays by a metal halide lamp so as to be cured. Then, the cured acrylic resin was separated from the mold. Thus, there was obtained a light pipe in which the cured resin layer having a plurality of light exit means and having a refractive index of 1.512 was closely integrated with the acrylic plate.

EXAMPLE 2

An optical sheet in which cured resin layer having a plurality of light exit means was closely integrated with a triacetyl cellulose (TAC) film was obtained in the same manner as in Example 1 except that the acrylic plate was replaced by such a TAC film. The TAC film side of the optical sheet was bonded to an acrylic plate having a refractive index of 1.495 through an adhesive layer having a refractive index of 1.508. Thus, a light pipe was obtained.

EXAMPLE 3

A light pipe was obtained in the same manner as in Example 1 except that the mold A was replaced by the mold B.

EXAMPLE 4

A light pipe was obtained in the same manner as in Example 2 except that the mold A was replaced by the mold B.

Comparative Example 1

A light pipe was obtained in the same manner as in Example 1 except that the mold A was replaced by the mold C.

Comparative Example 2

A light pipe was obtained in the same manner as in Example 2 except that the mold A was replaced by the mold C.

Evaluation Test

A light-emitting diode (LED) was disposed in the virtual center of the light exit means on the incidence side surface of the light pipe obtained in each of Examples 1 to 4 or in the center portion of the incidence side surface of the light pipe obtained in each of Comparative Examples 1 and 2. A power supply was connected to the LED. Thus, a planar light source unit was obtained. A normally white reflection type liquid-crystal panel was disposed on the light exit side (the lower surface of the light pipe). Thus, a reflection type liquid-crystal display device was obtained. The display device was observed while the LED was turned on in the condition that the liquid-crystal panel was supplied with no voltage. As a result, in all Examples 1 to 4, light was emitted approximately evenly from the display screen whereas, in Comparative Examples 1 and 2, very uneven light emission with a large difference between brightness and darkness was obtained because light was emitted linearly from a portion corresponding to the position of arrangement of the LED so as to be perpendicular to the incidence side surface but light was little emitted from the other portions.

On the other hand, a display image on the liquid-crystal panel was observed in a dark room while the liquid-crystal panel was supplied with a certain voltage in the condition that the LED was turned on. As a result, in all Examples 1 to 4, the display image was bright and easy to read whereas, in Comparative Examples 1 and 2, it was easy to read the display image from the linear portion from which light was emitted but it was difficult to read the display image from the other portions. Contrariwise, the display image was observed in a bright room while the liquid-crystal panel was supplied with a certain voltage in the condition that the LED was turned off. As a result, in all Examples 1 to 4, the display image was bright and easy to read because the light exit means were hardly viewed and because there occurred no moire or the like whereas, in Comparative Examples 1 and 2, the display image was very difficult to read because moire occurred.

It is apparent from the above description that by use of the light pipe according to the present invention, it is possible to obtain a planar light source unit which is bright and excellent in uniformity of light emission when a point light source is disposed on a side surface of the light pipe, and that by use of the planar light source unit, it is possible to obtain a front-light reflection type liquid-crystal display device which is free from moire, bright and easy to view.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:
a plate-like body having upper and lower surfaces; and
an incidence side surface constituted by a side surface between said upper and lower surfaces, said plate-like body including light exit means formed in said upper surface so that light incident on said incidence side surface is made to exit from said lower surface through said light exit means, said light exit means being in an arrangement to face at least one virtual center on or outside said incidence side surface, whereby incident light from said upper or lower surface is transmitted to exit from said lower or upper surface through said plate-like body,
wherein said light exit means is disposed concentrically around said virtual center when said plate-like body is viewed from a plan view.

2. A light pipe comprising:
a plate-like body having upper and lower surfaces; and
an incidence side surface constituted by a side surface between said upper and lower surfaces, said plate-like body including light exit means formed in said upper surface so that light incident on said incidence side surface is made to exit from said lower surface through said light exit means, said light exit means being in an arrangement to face at least one virtual center on or outside said incidence side surface, whereby incident light from said upper or lower surface is transmitted to exit from said lower or upper surface through said plate-like body,
wherein said light exit means is constituted by a repetitive structure of pit-like arrangement of concave or convex portions each having a width of 10 $\mu$m to 200 $\mu$m and a depth or height of 2 $\mu$m to 50 $\mu$m, and wherein each of said concave or convex portions has an optical path changing surface inclined at an angle in a range of from 35 to 48 degrees with respect to a reference plane of said lower surface so that said light incident on said incidence side surface is reflected toward said lower surface by said optical path changing surface, and an elevation surface opposite to said optical path changing surface and having an angle not lower than 50 degrees with respect to said reference plane.

3. A light pipe according to claim 1, wherein a projected area of said light exit means on said upper surface is at least 1/100, but not larger than 1/8, of said upper surface.

4. A light pipe according to claim 2, wherein an inclination angle of each of said optical path changing surfaces with respect to said reference plane of said lower surface is in a range of from 38 to 45 degrees.

5. A light pipe according to claim 1, wherein said light exit means is constituted by a repetitive structure of concave portions each shaped substantially like a scalene triangle in section.

6. A light pipe according to claim 1, wherein said arrangement of said light exit means in said upper surface so as to face said virtual center is irregular.

7. A light pipe according to claim 1, wherein said arrangement of said light exit means in said upper surface so as to face said virtual center becomes denser in terms of the area of said light exit means as said arrangement becomes farther from said virtual center.

8. A planar light source unit comprising a light pipe according to claim 1, wherein a point light source is disposed in said virtual center of said light exit means of said light pipe or between said virtual center and said incidence side surface.

9. A reflection type liquid-crystal display device comprising a planar light source unit according to claim 8, and a liquid-crystal panel including a reflection layer disposed on a lower surface side of said light pipe in said planar light source unit.

* * * * *